(12) United States Patent
Schlierbach et al.

(10) Patent No.: US 6,519,889 B1
(45) Date of Patent: Feb. 18, 2003

(54) BRIGHT POINT SIGHT

(75) Inventors: Armin Schlierbach, Leun Bsp. (DE); Uwe Weidemann, Greifenstein (DE)

(73) Assignee: Hensoldt Systemtechnik GmbH, Wetzlar (DE)

( * ) Notice: Subject to any disclaimer, the term of this patent is extended or adjusted under 35 U.S.C. 154(b) by 0 days.

(21) Appl. No.: 09/708,180

(22) Filed: May 10, 2001

(30) Foreign Application Priority Data

Jul. 26, 2000 (DE) .......................................... 100 36 303
Sep. 20, 2000 (DE) .......................................... 100 46 878

(51) Int. Cl.⁷ ................................................ F41G 1/30
(52) U.S. Cl. ............................. 42/113; 42/131; 42/120; 356/251
(58) Field of Search ........................... 42/131, 113, 120, 42/130, 132; 356/251, 247; 33/263, 297

(56) References Cited

U.S. PATENT DOCUMENTS

| | | | | |
|---|---|---|---|---|
| 4,402,605 A | * | 9/1983 | Ekstrand | 356/252 |
| 4,993,833 A | * | 2/1991 | Lorey et al. | 356/252 |
| 5,044,748 A | * | 9/1991 | Scott et al. | 356/251 |
| 5,189,555 A | * | 2/1993 | Jorlov | 356/247 |
| 5,440,387 A | * | 8/1995 | Montelin et al. | 356/251 |
| 5,493,450 A | * | 2/1996 | Ekstrand | 356/247 |
| 5,594,584 A | * | 1/1997 | Kay et al. | 356/251 |
| 6,327,806 B1 | * | 12/2001 | Paige | 42/113 |

FOREIGN PATENT DOCUMENTS

| | | | | |
|---|---|---|---|---|
| EP | 0 018 449 A1 | 4/1979 | | G02B/23/10 |
| EP | 0 651 225 A1 | 9/1994 | | F41G/1/34 |
| EP | 0 431 097 B1 | 10/1995 | | F41G/1/35 |
| FR | 1.254.637 A | 1/1961 | | F41G/1/30 |
| FR | 2.608.748 A | 6/1988 | | F41G/130/32 |
| GB | 2 120 381 A | 11/1983 | | G01B/11/14 |
| GB | 2 292 465 A | 2/1996 | | G02B/23/10 |

* cited by examiner

Primary Examiner—Michael J. Carone
Assistant Examiner—Gabriel Sukman

(57) ABSTRACT

A reflection sight with at least one lens arranged on the object side and bearing a partially reflecting layer, wherein the lens bearing the partially reflecting layer is arranged perpendicular to the mid-axis of the reflection sight.

11 Claims, 3 Drawing Sheets

BRIGHT POINT SIGHT

CROSS-REFERENCES TO RELATED APPLICATIONS

Not applicable.

STATEMENT REGARDING FEDERALLY SPONSORED RESEARCH OF DEVELOPMENT

Not applicable.

BACKGROUND OF THE INVENTION

The invention relates to a reflection sight comprising at least one lens arranged on an object side of the reflection sight and bearing a partially reflecting layer.

TECHNICAL FIELD

Reflection sights are known from EP 651 225 A1 and EP 018 449 A1 which have on the object side a lens which is provided with a partially reflecting layer. At least this lens bearing the partially reflecting layer is arranged at a tilt angle to the optical axis. Aberrations result from this tilted arrangement of the lens system on the object side. These aberrations have an unfavorable appearance to the user when observing his target object through the reflection sight.

A portable firearm equipped with a targeting device is known from EP431 097 B1. In the case of this portable firearm, a light beam is directed at the target object, the light beam being directed parallel to the barrel of the firearm and being produced by a laser diode. The light beam is coupled-in by means of a light guide, which is provided at the end with a collimator lens.

SUMMARY OF THE INVENTION

The invention has as its object to provide a reflection sight with an improved imaging quality.

A further object of the invention is to provide a reflection sight, which is in readiness for unexpected use.

The objects of the invention are attained by a reflection sight comprising at least one lens arranged on an object side of the reflection sight and bearing a partially reflecting layer, said lens bearing said partially reflecting layer being arranged perpendicular to a mid-axis of the reflection sight and a reflection sight comprising a light source that is electrically operated, and a solar cell that provides electrical energy for said light source.

By the measure which arranges the lens bearing the partially reflecting layer at right angles to the mid-axis of the reflection sight, aberrations which originate from the arrangement of the mid-axis of the reflection sight at an angle to the perpendicular to the mid-axis are avoided.

It has been found to be advantageous to provide the marking of the sight by means of a light beam which is reflected at the partially reflecting layer back into the user's eye, with the light beam propagating along an axis which coincides with the mid-axis.

It has been found to be advantageous to arrange the light source on the mid-axis, the light beam for the provision of a sight marking being emergent from this light source.

It has been found to be advantageous to use a LED as the light source. In an advantageous embodiment example, the light source is arranged on a transparent support, which preferably occludes the reflection sight on the side assigned to the user.

It has been found to be advantageous to arrange the electrical leads to the light source as thin leads so that when in use they do not appear visible to the user.

It has been found to be advantageous to form, on the edge region of the support element, contact faces which are connected to the light source by the leads.

It has been found to be advantageous to provide the reflection sight with a solar cell, by means of which at least the energy required for the operation of the light source can be provided. By the provision of the solar cell, the reflection sight is always in readiness under conditions of sufficient light to permit shooting.

Provision can be made to associate with the solar cell an energy storage means, also termed a storage battery, which is charged with electrical energy by the solar cell at times when there is more electrical energy than required for the operation of the light source, and is discharged during operation of the reflection sight in times of twilight or when the marksman is positioned in shadow.

It has been found to be advantageous to provide the solar cell or else the battery with an ammeter so that the light intensity can be detected. It can be provided that, on falling below a predetermined boundary value, the light source of the reflection sight is switched off in order to save energy. The boundary value is preferably chosen such that aiming is no longer possible under such lighting conditions. In such embodiments, it has been found to be advantageous to provide an actuating element by means of which the light source of the reflection sight can be switched on or off, contrary to the control, which is provided. By this means, the reflection sight can be set in operation even when falling below the boundary value and even when the marksman is in darkness.

BRIEF DESCRIPTION OF THE DRAWINGS

The invention is described in more detail with the aid of the following embodiment example.

DETAILED DESCRIPTION OF PREFERRED EMBODIMENTS

Figure 1:
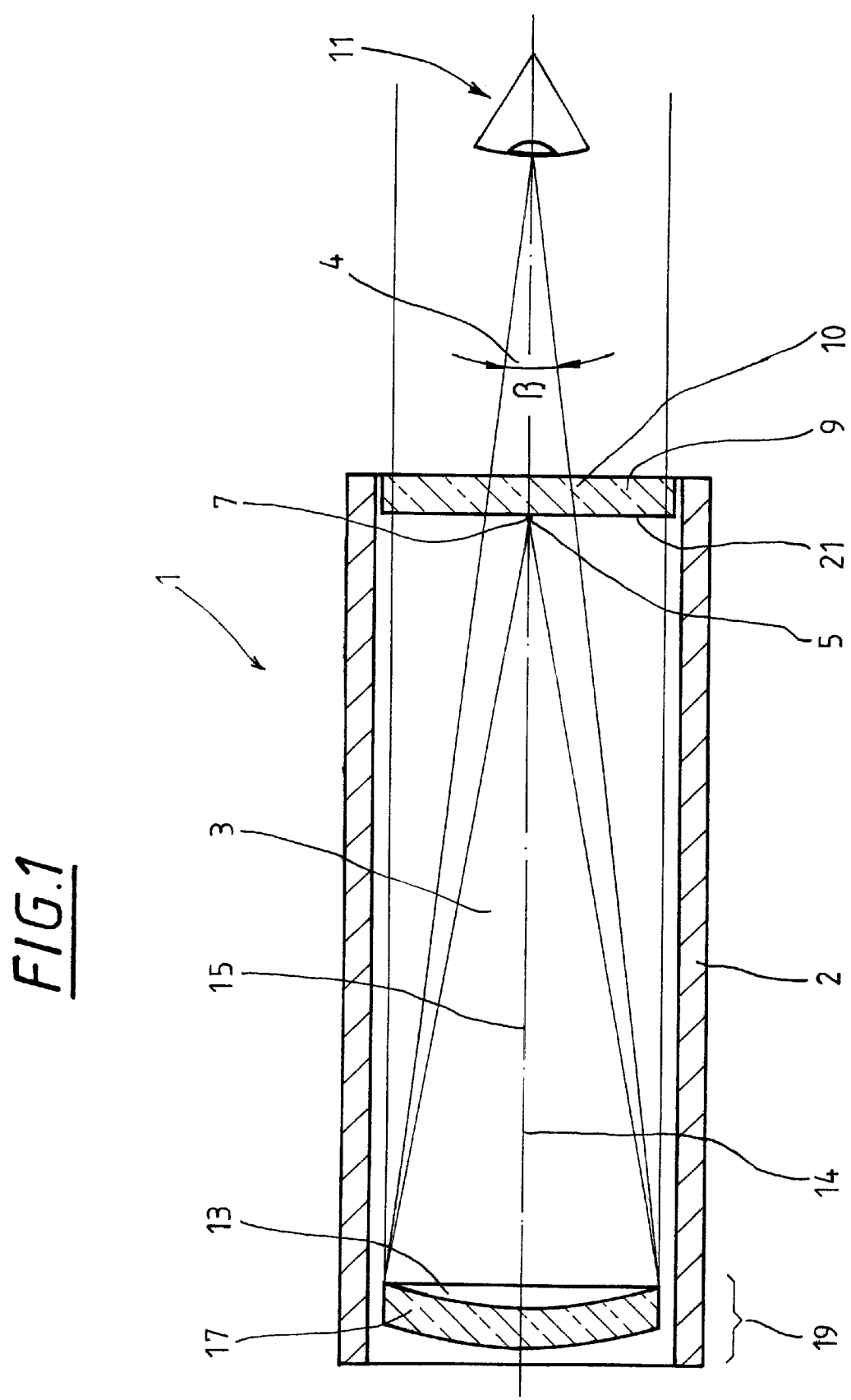
FIG. 1 shows a longitudinal section through a reflection sight.

The construction of the reflection sight is described with the aid of FIG. 1. The reflection sight includes a housing 2 in which there is mounted a lens system 19, here a lens 17, arranged on the object side. A support element 9 of transparent material is arranged on the side of the reflection sight 1 facing toward the user. A light source 5, here an LED 7, is mounted by means of this support element 9. A light guide could also be provided instead of the light source, emitting a light beam directed along the mid-axis.

The light beam emergent from the light source is propagated along an axis 14, which coincides with the mid-axis 15 of the reflection sight 1. The light beam strikes the partially reflecting layer 13 and is reflected by the partially reflecting layer into the eye 11 of the user. The light reflected at the partially reflecting layer 13 is superposed on the light incident into the reflection sight. A sharply imaged sight marking at infinity becomes visible to the user, lying within his visual field angle 4.

In the embodiment example shown, the support element is formed as a plane parallel plate. An optical element such as a lens could however also be provided.

Figure 2:
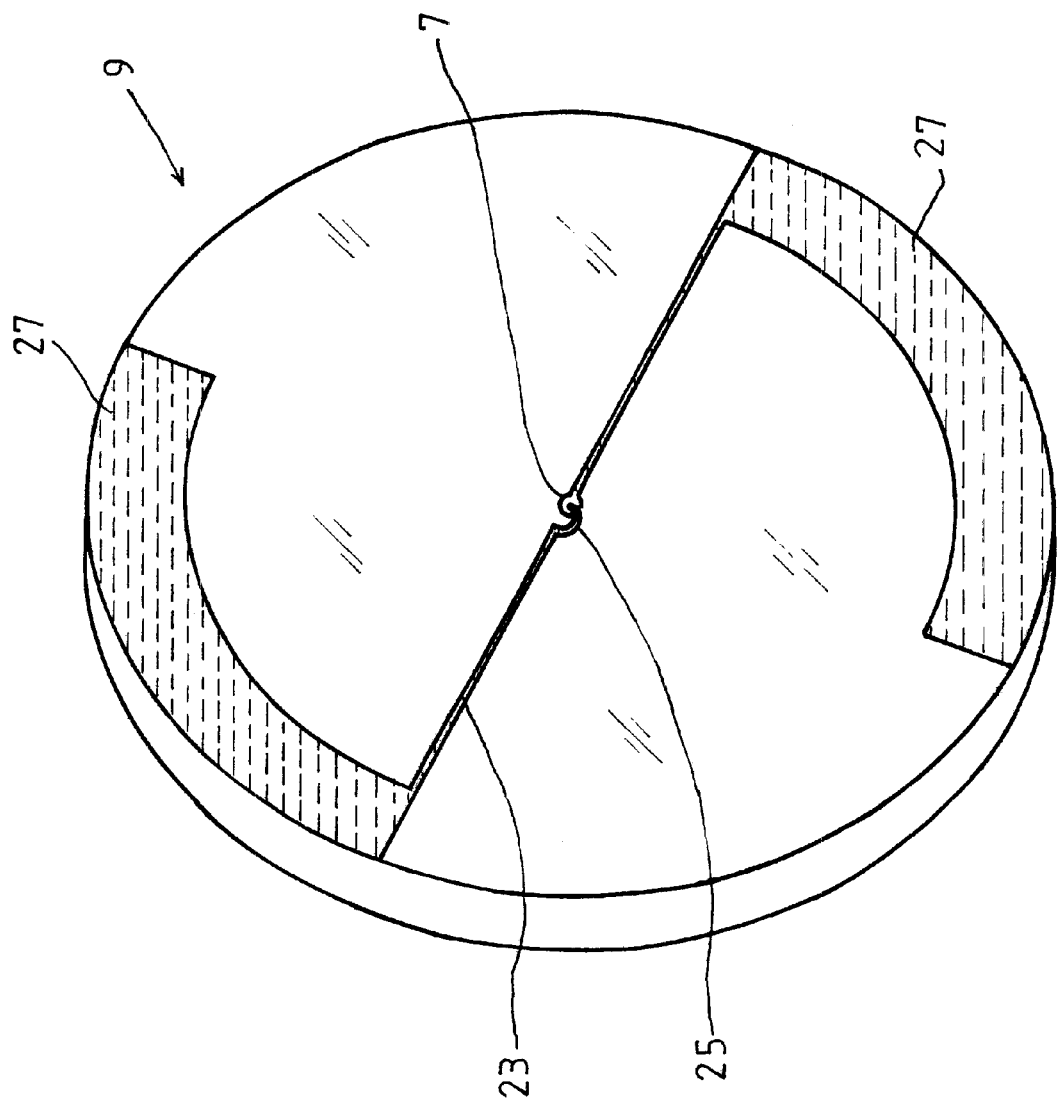
FIG. 2 shows a support element.

The constitution of the support element is shown in more detail in FIG. 2. A LED 7 is arranged in the middle of the support element 9, and is connected by means of a bonded wire 25 and via the electrical leads 23 to contact surfaces 27 which are arranged in an edge region of the support element 9. The electrical leads are made thin, such that when in use they do not appear visible to the user.

Figure 3:
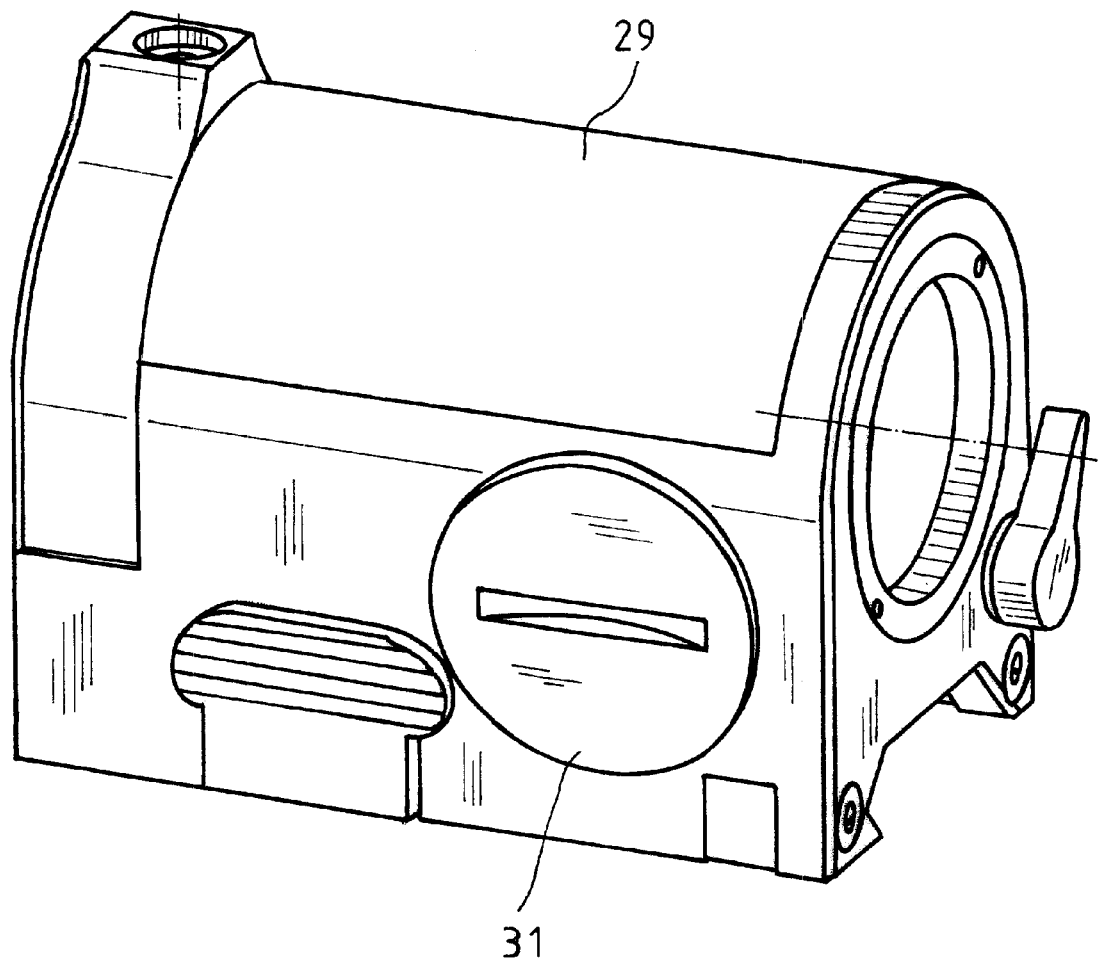
FIG. 3 shows a reflection sight with solar cell.

A sight device is shown in FIG. 3, having a solar cell 29. This arrangement furthermore has a battery, which is arranged under the cover 31.

| Reference List |
| --- |
| 1 reflection sight |
| 2 housing |
| 3 light beam |
| 4 visual field angle |
| 5 light source |
| 7 LED |
| 9 support element |
| 10 support plate |
| 11 user's eye |
| 13 partially relfecting plate |
| 14 axis |
| 15 mid-axis of the reflection sight |
| 17 lens |
| 19 lens system on object side |
| 21 optical element arranged on user side |
| 23 electrical lead |
| 25 bonded wire |
| 26 contact surface |
| 29 solar cell |
| 31 energy storage unit/battery |

What is claimed is:

1. A reflection sight comprising a light source, a mid-axis and at least one lens arranged on an object side of the reflection sight and bearing a partially reflecting layer, said mid-axis of the reflection sight passing through a center of said lens, said lens bearing said partially reflecting layer being arranged perpendicular to said mid-axis of the reflection sight, and said light source being arranged on said mid-axis of the reflection sight and emitting light in a direction of the at least one lens.

2. The reflection sight according to claim 1, wherein a light beam is reflected at said partially reflecting layer and is propagated along an axis that coincides with said mid-axis of the reflection sight.

3. The reflection sight according to claim 1, wherein said light source comprises an LED.

4. The reflection sight according to claim 1, further comprising electrical leads, wherein current is applied to said light source via said electrical leads, said electrical leads being so thin that when in use they do not appear visible to a user.

5. The reflection sight according to claim 1, further comprising a light guide that couples-in a light beam.

6. A reflection sight according to claim 1, comprising a light source that is electrically operated, and a solar cell that provides electrical energy for said light source.

7. The reflection sight according to claim 6, further comprising an energy storage unit associated with said solar cell to ensure readiness in insufficient light conditions.

8. The reflection sight according to claim 6, further comprising an ammeter associated with said solar cell for detection of brightness, the reflecting sight being in operation when a minimum brightness is exceeded.

9. The reflection sight according to claim 1, further comprising a light source that is electrically operated, and a solar cell that provides electrical energy for said light source.

10. A reflection sight comprising at least one lens arranged on an object side of the reflection sight and bearing a partially reflecting layer, said lens bearing said partially reflecting layer being arranged perpendicular to a mid-axis of the reflection sight, further comprising a light source arranged on said mid-axis of the reflection sight, and a support element of transparent material to which said light source is mounted.

11. The reflection sight according to claim 10, further comprising contact surfaces on an edge region of said support element.

* * * * *